March 21, 1967      E. G. RHODES      3,310,392
ELECTRICAL CAPACITOR MANUFACTURE
Filed March 19, 1962      2 Sheets-Sheet 1

INVENTOR.
EUGENE G. RHODES
BY Clarence R. Patty, Jr.
ATTORNEY

United States Patent Office 3,310,392
Patented Mar. 21, 1967

3,310,392
ELECTRICAL CAPACITOR MANUFACTURE
Eugene G. Rhodes, Bradford, Pa., assignor to Corning Glass Works, Corning, N.Y., a corporation of New York
Filed Mar. 19, 1962, Ser. No. 180,662
7 Claims. (Cl. 65—54)

This invention relates to an improvement in the type of electrical capacitor disclosed in Smith Patents Nos. 2,405,529 issued Aug. 6, 1946, 2,526,703 issued Oct. 24, 1950, and 2,696,577 issued Dec. 7, 1954, and in the Bair Patent No. 2,526,704 issued Oct. 24, 1950, and more particularly to a method of producing such an improved capacitor.

As described in these patents, such a capacitor consists of a plurality of thin glass sheets separated by thin metal foils which either alternately project beyond two opposite edges of the glass sheets and are embedded therebetween or have separate thin metallic ribbons or lead wires attached to said thin metal foils, which ribbons or wires project beyond said opposite edges while the metal foils are wholly embedded between said glass sheets. Production of capacitors of this type, as detailed in said patents, initially involves the formation of laterally spaced vertical stacks of sheets of metal foil arranged in the indicated fashion between continuous strips of glass. The resulting assembly is then heated at atmospheric pressure and subjected to pressure from pressing rollers, to form a unitary fused or bonded body, which can be separated into the individual capacitor units in any appropriate manner. Said Smith Patent No. 2,696,577 further teaches forming the outer of said sheets with said edges convexly curved.

In forming capacitors in accordance with the methods of the heretofore noted patents, air, which is inherently entrapped between the foil plates and the glass dielectric material in the form of flat blisters, would transform into spherical bubbles when the glass was heated to the softening point during the hermetic sealing process. Such a hermetic sealing process, which was conducted at atmospheric pressures employing pressure rollers, would produce said spherical bubbles of a size which would span the dielectric material, thereby substantially reducing the dielectric strength of the capacitor. The pressing rollers would apply sufficient pressure to seal the capacitor assembly and compress the entrapped air as it passed through them, but the entrapped bubbles would not be permanently reduced in size since the glass would have to be soft as it passed through the rollers enabling the bubbles to return to their original size after passing through. In addition, said bubbles could not be reduced in size after they became round, by for example subjecting the assembly to high pressures after said hermetic sealing, because the metallic foils would deform in the area of said bubbles causing erratic capacitance characteristics and dielectric strength of the resulting capacitor.

It is an object of this invention to provide an improved hermetically sealed capacitor wherein air entrapped during the sealing process does not have significant effect on capacitor performance.

Another object of this invention is to provide an improved method of hermetically sealing a capacitor.

Still another object is to provide a method for hermetically sealing a capacitor whereby the capacitor performance is not significantly effected by any entrapped air.

A further object is to provide an economic method for hermetically sealing capacitors which enables a high quality capacitor selection.

A further object is to provide a method for hermetically sealing capacitors, the dielectric strength of which is substantially uneffected by entrapped air.

Additional objects, features, and advantages of the present invention will become apparent to those skilled in the art, from the following detailed description and the attached drawings, on which, by way of example, only the preferred embodiments of the invention are illustrated.

According to the present invention a hermetically sealed capacitor substantially uneffected by entrapped air can be formed by first sealing the capacitor foil plates to the glass dielectric material by heating the capacitor stack to about the softening point of the glass components thereof, then, before any entrapped air in the form of flat blisters can transform into spherical bubbles, subjecting the capacitor assembly to high pressure while maintaining said assembly at a temperature of about the softening point of the glass thereby hermetically sealing the capacitor glass cover plates and causing said entrapped air to compress and form comparatively small bubbles which have a negligible effect on the capacitor performance; and thereafter reducing said temperature to below the softening point of glass while maintaining said high pressure, solidifying said glass dielectric and cover plates and retaining said entrapped air in the form of small spherical bubbles.

The softening point of glass is hereby defined as the temperature at which the viscosity of the glass is $10^{7.6}$ poises.

Figure 1:
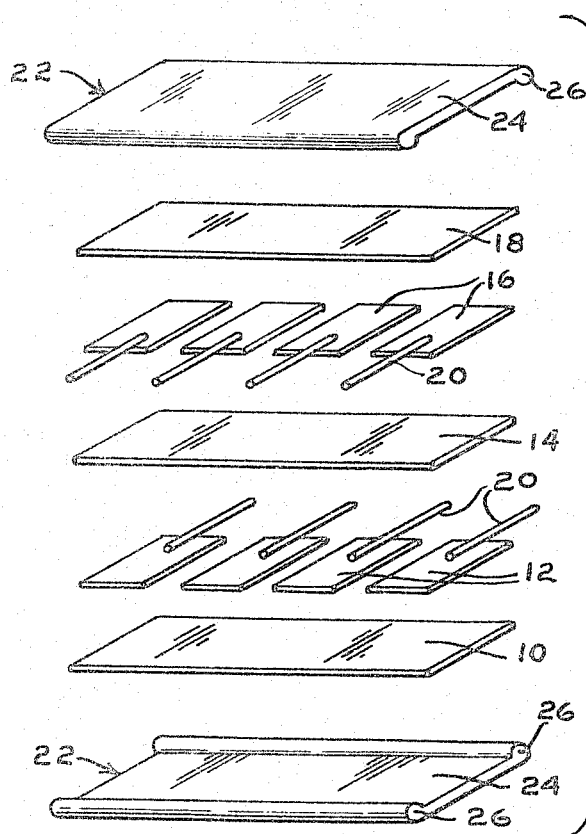
FIG. 1 is an exploded perspective view of an assembly of capacitor units and cover plates.

As described in the heretofore noted patents and as shown in FIG. 1, the assembly of capacitor units includes a strip 10 of thin glass sheet on which there is arranged in lateral spaced relationship a plurality of metal foil sheets 12, with one edge of each of said foil sheets set inward from the corresponding lateral edge of strips 10 and with the opposite edge of each foil sheet projecting beyond the corresponding opposite lateral edge of strip 10. A second glass strip 14 is superimposed on said foil sheets 12 in vertical register therewith in a second series of metallic foil sheets 16 which, however, project in a direction opposite to that of sheets 12. A third strip 18 of thin glass sheet is positioned over sheets 16 in vertical alignment with strips 10 and 14. The number of alternate layers of glass strips and metal foil is of course determined by the desired capacitance, however, for convenience a capacitor having only two layers of metal foil sheets is shown.

Leads 20 are attached by spot-welding or the like, to the oppositely projecting portions of the foil sheets 12 and 16 of each capacitor unit. Where the leads comprise wire, the ends may be conveniently flattened or otherwise shaped to facilitate such connection.

The resulting assembly of capacitor units is enclosed by two opposed shaped glass cover plates 22, each of which comprises a flat body portion 24 provided along each lateral edge with a bead or rib 26. The enclosed assembly may be conveniently built up by initially positioning glass strip 10 between the beads of one glass cover plate 22, forming the assembly of capacitor units thereon in the indicated manner, and then finally placing the other glass cover plate 22 over the completed assembly with respective leads 20 projecting from between the opposed beads 26 of the cover plates.

Figure 2:
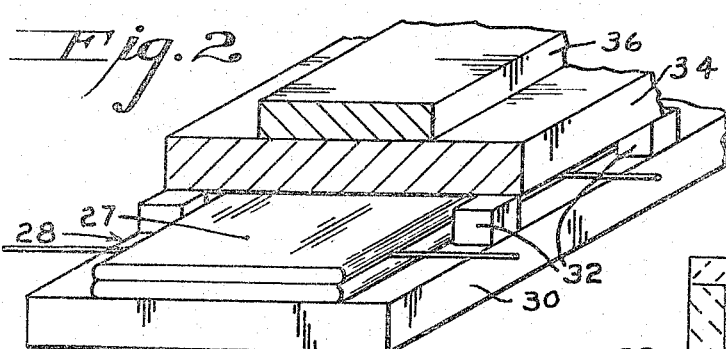
FIG. 2 is an oblique view of a capacitor stack disposed in a pallet.
Figure 3:
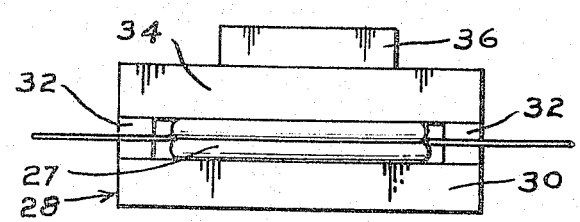
FIG. 3 is an end elevation of a capacitor stack disposed in a pallet.

The completed assembly 27 is then placed in a jig or pallet 28, shown in FIGS. 2 and 3, comprising base 30, capacitor thickness controlling separators 32 and top 34. Said assembly is disposed on base 30 between separators 32 and spaced therefrom with leads 20 projecting from said assembly between separators 32. The assembly is covered by top 34. The materials of pallet 28 are not critical as long as they can withstand a temperature of substantially the softening point of glass and do not adhere to or can be caused not to adhere to softened glass. A weight 36 is then placed on top 34.

The said pallet, with the capacitor assembly disposed therein, is then heated to about the softening point of the glass used, whereupon the various components of the capacitor assembly adhere to adjacent components. Weight 36 causes top 34 to compress the capacitor assembly until top 34 is stopped by spacers 32 establishing the thickness of said capacitor assembly and effecting said component adherence. It has been found that a weight exerting a pressure of between 1 to 20 p.s.i.g. on the capacitor assembly is suitable.

Figure 4:
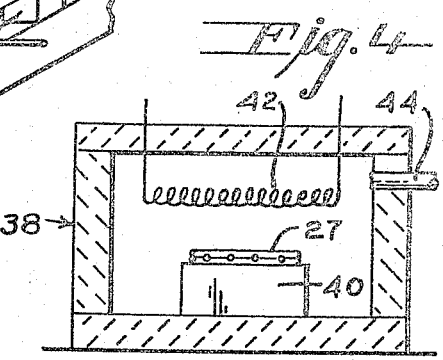
FIG. 4 is a cross sectional view of a high pressure furnace showing a capacitor stack being hermetically sealed.

Before any air, entrapped between the capacitor foil sheets within the dielectric material such as for example sheet 14 of FIG. 1 can transform to spherical bubbles as a result of surface tension of the softened glass, the assembly is subjected to high gas pressure, while the temperature of about the softening point of the glass is maintained. FIG. 4 illustrates a pressure furnace 38 within which capacitor assembly 27 is disposed upon a suitable non-glass adhering support 40. Temperature is maintained within said furnace 38 by suitable heating means 42. Gas is supplied to said furnace under pressure from a suitable source, not shown, through pipe 44. The pressure applied to the capacitor assembly causes the entrapped air to compress and partly go into glass solution. The volume and the cube of the diameters of the resulting compressed air spheres is proportional to the pressure applied.

The composition of the glass used in the capacitor assembly is not critical and any high dielectric glasses may be used. Suitable glasses are high thermal expansion alkali-lead-silicate glasses such as those covered by Armistead Patent No. 2,431,980.

Figure 5:
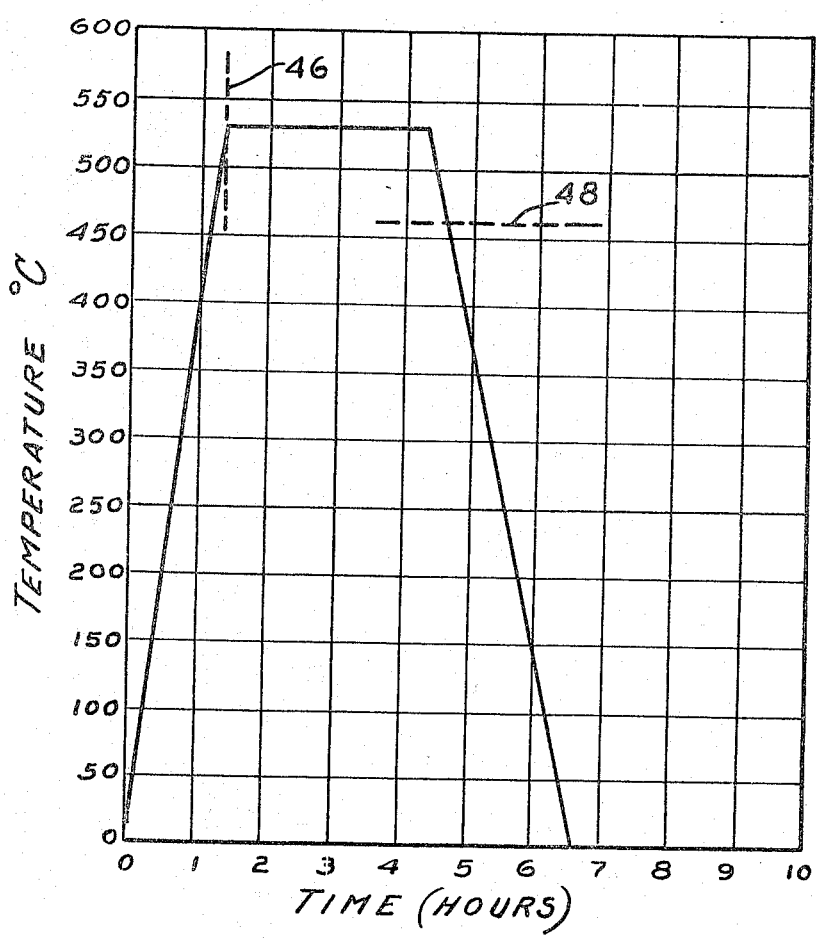
FIG. 5 is a curve of time vs. temperature illustrating the method of this invention.

FIG. 5 illustrates a typical capacitor assembly hermetic sealing cycle. Since the softening point varies with the various glasses, the curve illustrated is for glasses, such as for example, those covered by the heretofore noted Armistead patent. Dotted line 46 indicates the point at which the assembly is subjected to gas pressure. Dotted line 48 indicates the point at which the gas pressure may be discontinued, which point is below the softening point of the glass. The pressure of the gas is determined by the size of the bubbles which can remain in the capacitor without having a significant effect on the capacitor performance. It has been found that pressures ranging from about 250 p.s.i.g. to about 5000 p.s.i.g. satisfactorily reduce the size of the bubbles, however, pressures ranging from 750 p.s.i.g. to 1500 p.s.i.g. are preferred for most applications. Any gas may be used, however, nitrogen or like inert gas is preferred to reduce oxidation of the exposed capacitor leads. Gas pressure is maintained through the hermetic sealing and bubble size reducing period and is continued during the cooling period until the temperature of the capacitor assembly is substantially below the softening point of the glass, thereby enabling the bubbles to retain their reduced size.

As an example, capacitors formed in accordance with the method of this invention, wherein a gas pressure of 1500 p.s.i.g. is applied to the capacitor assembly, the resulting bubbles will be reduced approximately 100 times in volume from their size at atmospheric pressure. The diameter of said bubbles varying as the cube root of the volume, will be approximately one-fifth of the diameter at atmospheric pressure. Air bubbles so reduced in size, have an insignificant effect on the capacitor performance.

It is obvious that the described method may be carried out in two steps. The capacitor assembly, disposed in said pallet, may be heated to about the softening point of the glass components thereof at atmospheric pressure, thereby adhering the adjacent components of said assembly, followed by an immediate reduction of said temperature to below the softening point of said glass components. Thereafter the assembly may be removed from the pallet and placed in a pressure furnace wherein the hermetic seal may be effected and the entrapped air may be compressed to small spherical bubbles as described hereinabove in connection with the one-step operation. In a two-step operation, the capacitor assembly may be pressurized immediately upon being placed in the pressure furnace, since the entrapped air is sealed in the assembly at atmospheric pressure.

It is also obvious that, in a two-step operation, the capacitor assembly components may be adhered to adjacent components by employing pressing rollers such as are described in the hereinbefore noted Smith and Bair patents, if the said assembly is only maintained at a temperature of about the softening point of the glass components of said assembly for a period of time less than that in which the entrapped air, in the form of flat blisters, would transform into substantially spherical bubbles.

The capacitor assembly may be separated into individual capacitors by any suitable method, such for example as disclosed in the heretofore noted Smith and Bair patents.

Although the present invention has been described with respect to specific details of certain embodiments thereof, it is not intended that such details be limitations upon the scope of the invention except insofar as set forth in the following claims.

What is claimed is:

1. The method of manufacturing capacitors comprising forming a capacitor stack consisting of a plurality of thin glass strips separated by thin metallic foils having leads attached thereto disposed within glass covers, heating said stack to a temperature of about the softening point of the glass thereof thereby adhering adjacent components, applying gas pressure to said stack before any entrapped air within said stack transforms into spherical bubbles and maintaining said pressure until said stack is hermetically sealed and said entrapped air is compressed into small substantially spherical bubbles, reducing said temperature to below the softening point of said glass, and thereafter removing said pressure.

2. The method of manufacturing capacitors comprising the steps of forming a capacitor stack consisting of a plurality of thin glass strips separated by thin metallic foils having leads attached thereto disposed within glass covers, disposing said stack within means for supporting said stack and controlling its thickness, heating said stack to a temperature of about the softening point of the glass thereof thereby adhering adjacent components, applying gas pressure to said stack before any entrapped air within said stack transforms into spherical bubbles and maintaining said pressure until said stack is hermetically sealed and said entrapped air is compressed into small substantially spherical bubbles, reducing said temperature to below the softening point of said glass, and thereafter removing said pressure.

3. The method of claim 2 wherein said gas pressure ranges from about 750 pounds per square inch to about 1500 pounds per square inch.

4. The method of manufacturing capacitors comprising the steps of forming a capacitor stack consisting of a plurality of thin glass strips separated by thin metallic foils which alternately project beyond two opposite edges of the glass strips, attaching a flexible lead to each group of projecting metal foils, enclosing the glass strip-metal foil assembly between two opposite glass covers, heating said stack to a temperature of about the softening point of the glass thereof thereby adhering adjacent components, applying gas pressure to said stack before any entrapped air within said stack transforms into spherical bubbles and maintaining said pressure until said stack is hermetically sealed and said entrapped air is compressed into small substantially spherical bubbles, reducing said temperature to below the softening point of said glass, and thereafter removing said pressure.

5. The method of claim 4 further comprising the step of disposing said stack within means for supporting said stack and controlling its thickness prior to heating said stack to said temperature.

6. The method of claim 4 wherein said gas pressure ranges from 750 pounds per square inch to 1500 pounds per square inch.

7. The method of manufacturing capacitors comprising forming a capacitor stack consisting of a plurality of thin glass strips separated by thin, metallic foils disposed within glass covers, said foils having leads attached thereto which leads extend beyond the edges of said glass covers, disposing said stack within means for supporting said stack and controlling its thickness, heating said stack to a temperature of about the softening point of the glass thereof thereby adhering adjacent components, reducing said temperature to below the softening point of said glass before entrapped air transforms into spherical bubbles, removing said stack from said means, applying gas pressure of at least 250 pounds per square inch to said stack, reheating said stack to a temperature of about the softening point of said glass, maintaining said temperature and pressure until said stack is hermetically sealed and any air entrapped within said stack is compressed into small substantially spherical bubbles, reducing said temperature to below said softening point and thereafter removing said pressure.

References Cited by the Examiner

UNITED STATES PATENTS

| | | | |
|---|---|---|---|
| 2,386,820 | 10/1945 | Spencer | 65—32 |
| 2,405,529 | 8/1946 | Smith | 317—261 |
| 2,502,310 | 3/1950 | Chapman | 317—261 |
| 2,526,703 | 10/1950 | Smith | 65—23 |
| 2,526,704 | 10/1950 | Bair | 65—23 |
| 3,054,035 | 9/1962 | Howatt | 317—261 |

DONALL H. SYLVESTER, *Primary Examiner.*

JOHN T. BURNS, S. LEON BASHORE, *Examiners.*

E. GOLDBERG, G. R. MYERS, *Assistant Examiners.*